United States Patent
Shozaki et al.

(10) Patent No.: US 8,102,553 B2
(45) Date of Patent: *Jan. 24, 2012

(54) DATA COMMUNICATION SYSTEM, IMAGE PROCESSING APPARATUS, PROGRAM AND DATA COMMUNICATION METHOD

(75) Inventors: Toshiya Shozaki, Osaka (JP); Kaitaku Ozawa, Itami (JP); Ryuichi Kitaoka, Uji (JP); Junichi Hase, Osaka (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 926 days.

This patent is subject to a terminal disclaimer.

(21) Appl. No.: 12/073,655

(22) Filed: Mar. 7, 2008

(65) Prior Publication Data

US 2008/0225335 A1 Sep. 18, 2008

(30) Foreign Application Priority Data

Mar. 13, 2007 (JP) ................................. 2007-064216

(51) Int. Cl.
*G06F 3/12* (2006.01)
(52) U.S. Cl. ...... 358/1.15; 358/1.16; 358/402; 358/442; 709/207; 709/204; 379/100.17
(58) Field of Classification Search .................. 358/1.15, 358/1.16, 448, 402, 403, 442; 709/246, 207, 709/204, 310; 379/1.01, 100.1, 211.01, 100.17, 379/93, 32, 93.31
See application file for complete search history.

(56) References Cited

U.S. PATENT DOCUMENTS

| | | | | |
|---|---|---|---|---|
| 5,632,018 A * | 5/1997 | Otorii | ............................ | 709/200 |
| 6,330,080 B1 * | 12/2001 | Omori | ........................... | 358/407 |
| 7,200,245 B2 * | 4/2007 | Miyashita | .................... | 382/100 |
| 7,254,613 B2 * | 8/2007 | Fukushima | ................... | 709/206 |

(Continued)

FOREIGN PATENT DOCUMENTS

JP 06-216935 8/1994

(Continued)

OTHER PUBLICATIONS

Notification of Reasons for Refusal in JP 2007-064216 dated Feb. 3, 2009, and an English Translation thereof.

*Primary Examiner* — Negussie Worku
(74) *Attorney, Agent, or Firm* — Buchanan Ingersoll & Rooney PC

(57) ABSTRACT

A data communication system, an image processing apparatus, a program and a data communication method which permit a user to command a reply multicast transmission in reply to a multicast transmission with easy operations. In executing a multicast transmission of first image data, the image processing apparatus sends a job ID together with the first image data to a computer which is one of the receivers of the multicast transmission. Concurrently, the image processing apparatus stores the job ID and the receivers of the multicast transmission in relative to each other as history information. When the computer replies to the multicast transmission, the computer sends a reply e-mail including second image data and the job ID to the image processing apparatus. Then, the image processing apparatus extracts the job ID from the reply e-mail and searches the history information for receivers of the multicast transmission identified by the job ID. Thereafter, in accordance with the searched receivers, the image processing apparatus designates receivers of a reply multicast transmission and sends the second image data to the designated receivers.

17 Claims, 21 Drawing Sheets

U.S. PATENT DOCUMENTS

| | | | |
|---|---|---|---|
| 7,623,514 B2 * | 11/2009 | Ozawa et al. | 370/389 |
| 2002/0140989 A1 * | 10/2002 | Shinchi et al. | 358/402 |
| 2002/0184396 A1 * | 12/2002 | Fujikura | 709/310 |
| 2005/0219611 A1 * | 10/2005 | Yamashita et al. | 358/1.15 |
| 2006/0117370 A1 * | 6/2006 | Kitazato et al. | 725/116 |
| 2006/0221957 A1 * | 10/2006 | Ozawa et al. | 370/389 |
| 2007/0097423 A1 * | 5/2007 | Kawano | 358/1.15 |
| 2010/0010681 A1 * | 1/2010 | Zugibe et al. | 700/282 |
| 2010/0231965 A1 * | 9/2010 | Sunata | 358/1.15 |

FOREIGN PATENT DOCUMENTS

| | | |
|---|---|---|
| JP | 2001-22662 A | 1/2001 |
| JP | 2002-10015 A | 1/2002 |
| JP | 2002-297500 | 10/2002 |
| JP | 2003-099362 | 4/2003 |
| JP | 2004-032153 | 1/2004 |
| JP | 2004-112138 | 4/2004 |
| JP | 2004-280647 A | 10/2004 |
| JP | 2005-286679 | 10/2005 |

* cited by examiner

FIG. 8

```
Input receivers.
Then, press "SEND" button.

[SUBJECT]      JOB ID 1

[SENDER]       B@***.co.jp

[E-MAIL]      A@***.co.jp

[FAX]         C 03-1234-5678

[PRINTER]     D 192.168.100.10

[FILE
  TRANSFER]    ftp://192.168.200.20/xxx.tif
               E@***.co.jp

[MESSAGE]     Enclosed herewith is
               a material for
               the conference.

[CANCEL]   [SEND]
```

FIG. 9

| | | | | | | |
|---|---|---|---|---|---|---|
| mfp@***.co.jp/tel06-1234-5678/IP ADDRESS 192.168.300.30 | | | | | | |
| JOB ID | STORAGE AREA | SENDER | RECEIVER 1 | RECEIVER 2 | RECEIVER 3 | RECEIVER 4 |
| JOB ID 1 | BOX 1/"20070207151058.pdf" | B@*.co.jp | A@*.co.jp | C:tel 0312345678 | D:IP 192.168.100.10 | E:ftp://192.168.200.20/xxx.tif E@***.co.jp |
| JOB ID 2 | BOX 2/"20070208101232.pdf" | B@*.co.jp | E:ftp://192.168.200.20/xxx.tif E@*.co.jp | | | |
| JOB ID 3 | BOX 3/"20070214123018.pdf" | B@*.co.jp | C:tel 0312345678 | D:IP 192.168.100.10 | E:ftp://192.168.200.20/xxx.tif E@*.co.jp | |

FIG. 11

```
To:         A@***.co.jp
From:       B@***.co.jp
Subject:    JOB ID 1
Reply-To:   mfp@*.co.jp Sender:  B@*.co.jp This is sent via MFP.

CC;

FAX C 03-1234-5678
PRINTER D 192.168.100.10
FILE TRANSFER ftp://192.168.200.20/xxx.tif
              E@***.co.jp You can command a reply multicast
transmission to the receivers above
by sending a reply to this mail.

Message:
Enclosed herewith is
a material for the conference.

|ATTACHMENT|
```

FIG. 13

1st PAGE

```
To:     03-1234-5678
From:   06-1234-5678

This is sent via MFP.

Sender:  B@***.co.jp

CC:

E-MAIL A@***.co.jp
PRINTER D 192.168.100.10
FILE TRANSFER ftp://192.168.200.20/xxx.tif
             E@***.co.jp Message:
Enclosed herewith is
a material for the conference.
```

2nd PAGE

IMAGE DATA

FIG. 16

```
To:      E@***.co.jp
From:    mfp@***.co.jp
Title:   JOB ID 1
```

Sender: B@***.co.jp

This is to notify that data have been transferred from MFP to server.

ftp://192.168.200.20/xxx.tif

CC;

E-MAIL A@***.co.jp
FAX C 03-1234-5678
PRINTER D 192.168.100.10

Message:
Enclosed herewith is
a material for the conference.

F I G. 1 8

| NEW DOC. | PRINT | REPLY | REPLY TO ALL | FORWARD | | |
|---|---|---|---|---|---|---|
| RECEIVING TRAY | | RECEIVING TRAY | | | | |
| SENDING TRAY | | SENDER | | SUBJECT | DATE | |
| SENT ITEMS | | Mr. H | | HELLO | 2007/02/06/13:40 | |
| NUISANCES | | Mr. F | | MEETING | 2007/02/06/15:50 | |
| | | mfp@***.co.jp | | JOB ID 1 | 2007/02/07/15:10 | |

FIG. 19

```
To:         mfp@***.co.jp
From:       A@***.co.jp
Subject:    RE:JOB ID 1
```

```
Message:
Enclosed herewith is
an additional material.
```

[ATTACHMENT]

FIG. 22 mfp@***.co.jp/tel06-1234-5678/IP ADDRESS 192.168.300.30

| JOB ID | STORAGE AREA | SENDER | RECEIVER 1 | RECEIVER 2 | RECEIVER 3 | RECEIVER 4 |
|---|---|---|---|---|---|---|
| JOB ID 1 | BOX 1/"20070207151058.pdf" | B@*.co.jp | A@*.co.jp | C:tel 0312345678 | D:IP 192.168.100.10 | E:ftp://192.168.200.20/xxx.tif E@***.co.jp |
| JOB ID 2 | BOX 2/"20070208101232.pdf" | B@*.co.jp | E:ftp://192.168.200.20/xxx.tif E@*.co.jp | | | |
| JOB ID 3 | BOX 3/"20070214123018.pdf" | B@*.co.jp | C:tel 0312345678 | D:IP 192.168.100.10 | E:ftp://192.168.200.20/xxx.tif E@*.co.jp | |
| RE:JOB ID 1 | BOX 4/"tuika siryou.pdf" | A@*.co.jp | B@*.co.jp | C:tel 0312345678 | D:IP 192.168.100.10 | E:ftp://192.168.200.20/xxx.tif E@***.co.jp |

DATA COMMUNICATION SYSTEM, IMAGE PROCESSING APPARATUS, PROGRAM AND DATA COMMUNICATION METHOD

This application is based on Japanese patent application No. 2007-064216 filed on Mar. 13, 2007, the content of which is herewith incorporated by reference.

BACKGROUND OF THE INVENTION

1. Field of the Invention

The present invention relates to a data communication system, an image processing apparatus, a program and a data communication method, and more particularly to a data communication system comprising an image processing apparatus and a data communication device which are connected to be communicable with each other, the image processing apparatus in the data communication system, a program for the data communication system and a data communication method carried out by the data communication system.

2. Description of Related Art

U.S. patent laid-open publication No. US2002/0140989 discloses a technical idea for executing a reply multicast transmission in reply to a multicast transmission under different communication protocols, such as a transmission by e-mail, a transmission by facsimile, etc.

In the above-mentioned technical idea, however, in order to command a reply multicast transmission in reply to a multicast transmission, the user must perform complicating operations. According to the above-mentioned technical idea, specifically, the user makes an access to an URL shown in an e-mail or a facsimile sent to the user by the multicast transmission and opens a reply command screen, where the user manually inputs receivers of the reply multicast transmission. Then, an apparatus which executed the multicast transmission transforms data into formats suited for individual communication protocols and executes a reply multicast transmission.

SUMMARY OF THE INVENTION

An object of the present invention is to provide a data communication system, an image processing device, a program and a data communication method which permit a user to command a reply multicast transmission in reply to a multicast transmission with easy operations.

The present invention relates to a data communication system wherein an image processing apparatus and a data communication device are connected to each other so as to be communicable with each other. According to the present invention, the image processing apparatus comprises: a multicast transmission section for making an e-mail including identification information for identifying a multicast transmission and for executing a multicast transmission including a transmission of the e-mail and a transmission of information included in the e-mail under another communication protocol; and a history information generating section for generating history information showing the identification information and receivers of the multicast transmission identified by the identification information in connection with each other. The data communication device comprises: a first receiving section for receiving the e-mail sent by the multicast transmission; a first extracting section for extracting the identification information from the e-mail; a mail generating section for making a reply e-mail including the identification information; and a sending section for sending the reply e-mail to the image processing apparatus. The image processing apparatus further comprises: a second receiving section for receiving the reply e-mail; a second extracting section for extracting the identification information from the reply e-mail; and a designating section for designating receivers of a reply multicast transmission based on the identification information and the history information, and the multicast transmission section executes a reply multicast transmission to the receivers designated by the designating section.

The present invention is applicable to the image processing apparatus in the data communication system. Specifically, the present invention also relates to an image processing apparatus which is communicable with a data communication device. According to the present invention, the image processing apparatus comprises: a multicast transmission section for making an e-mail including identification information for identifying a multicast transmission and for executing a multicast transmission including a transmission of the e-mail and a transmission of information included in the e-mail under another communication protocol; a history information generating section for generating history information showing the identification information and receivers of the multicast transmission identified by the identification information in connection with each other; a receiving section for receiving a reply e-mail from said data communication device as a reply to the e-mail sent by the multicast transmission, the reply e-mail including the identification information; an extracting section for extracting the identification information from the reply e-mail; and a designating section for designating receivers of a reply multicast transmission based on the identification information and the history information, and the multicast transmission section executes a reply multicast transmission to the receivers designated by the designating section.

Also, the present invention is applicable to a software program to be installed in an image processing apparatus. Specifically, the present invention also relates to a software program stored in a storage medium for causing a computer provided in an image processing apparatus communicable with a data communication device to execute processing comprising: a step of executing a multicast transmission by making an e-mail including identification information for identifying the multicast transmission and by executing a transmission of the e-mail and a transmission of information included in the e-mail under another communication protocol; a step of generating history information showing the identification information and receivers of the multicast transmission identified by the identification information in connection with each other; a step of receiving a reply e-mail from said data communication device as a reply to the e-mail sent by the multicast transmission, the reply e-mail including the identification information; a step of extracting the identification information from the reply e-mail; a step of designating receivers of a reply multicast transmission based on the identification information and the history information; and a step of executing a reply multicast transmission to the designated receivers.

Further, the present invention is applicable to a data communication method carried out by an image processing apparatus. Specifically, the present invention further relates to a data communication method carried out by an image processing apparatus communicable with a data communication device, and the data communication method comprises: a step of executing a multicast transmission by making an e-mail including identification information for identifying the multicast transmission and by executing a transmission of the e-mail and a transmission of information included in the e-mail under another communication protocol; a step of generating history information showing the identification information and receivers of the multicast transmission identified by the identification information in connection with each other; a step of receiving a reply e-mail from said data communication device as a reply to the e-mail sent by the multicast transmission, the reply e-mail including the identification information; a step of extracting the identification information from the reply e-mail; a step of designating receivers of a reply multicast transmission base on the identification information and the history information; and a step of executing a reply multicast transmission to the designated receivers.

The image processing apparatus according to the present invention may further comprise an ID issuing section for issuing the identification information.

In the image processing apparatus, the multicast transmission section may enter an e-mail address of the image processing apparatus in the e-mail as an address to which a reply e-mail is to be sent.

In the image processing apparatus, the multicast transmission section may enter the identification information in the e-mail as a subject.

Also, according to the present invention, the mail generating section of said data communication device may enter the identification information in the reply-e-mail as a subject.

BRIEF DESCRIPTION OF THE DRAWINGS

This and other objects and features of the present invention will be apparent from the following description with reference to the accompanying drawings, in which:

FIG. 8 is an illustration of a receiver input screen for promoting a user to input receivers of a multicast transmission;

FIG. 9 is an illustration of an exemplary data table;

FIG. 11 is an illustration of an example of the e-mail;

FIG. 13 is an illustration of an example of the facsimile;

FIG. 16 is an illustration of an example of the notice e-mail;

FIG. 18 is an illustration of a sending/receiving screen of an e-mail software program installed in the computer;

FIG. 19 is an illustration of an example of the reply e-mail;

FIG. 22 is an illustration of the updated data table.

DETAILED DESCRIPTION OF THE PREFERRED EMBODIMENTS

A data communication system and an image processing apparatus according to the present invention are hereinafter described with reference to the accompanying drawings.

Structure of Data Communication System

Figure 1:
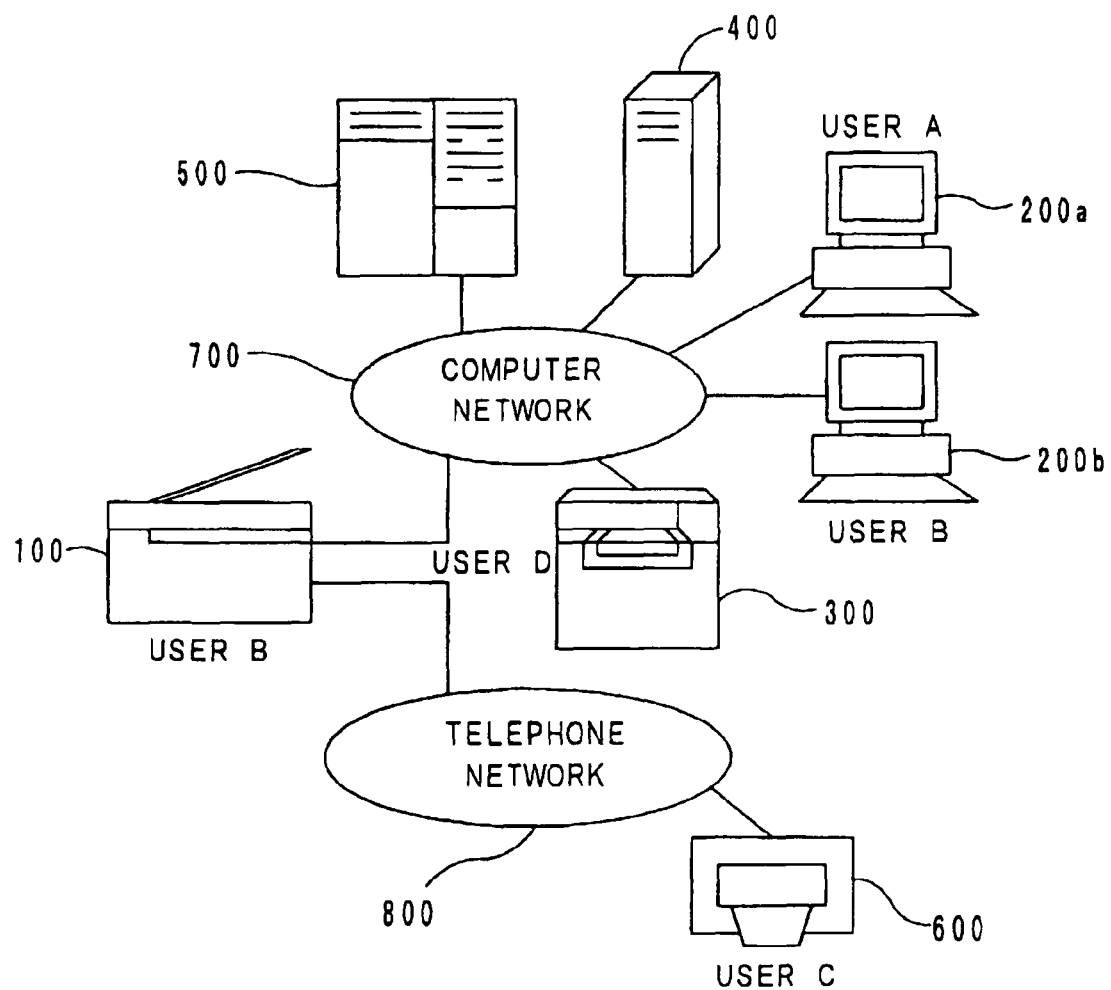
FIG. 1 is a block diagram of an exemplary data communication system according to the present invention.

FIG. 1 is a block diagram showing an exemplary data communication system according to the present invention. The data communication system comprises an image processing apparatus 100, computers 200a and 200b functioning as data communication devices, a printer 300, an e-mail server 400, an FTP server 500 and a facsimile 600. In this embodiment, a user A uses the computer 200a, and a user B uses the image processing apparatus 100 and the computer 200b. A user C uses the facsimile 600, and a user D uses the printer 300. Further, a computer (not shown) used by a user E is connected to the FTP server 500 via a computer network 700.

The image processing apparatus 100 is connected to the computer network 700 and to a telephone line network 800. The computer network 700 is, for example, a LAN (local area network), a WAN (wide area network) or an internet. The telephone line network 800 is, for example, a public telephone network.

The image processing apparatus 100 is an MFP (multifunction peripheral) having a function as a scanner for obtaining image data by reading a document image, a function as a printer for printing an image in accordance with print data and a function as a facsimile for sending and receiving facsimile data. The image processing apparatus 100 further transforms the image data obtained by reading a document into formats suited for various communication protocols and sends the data in the various formats.

More specifically, the image processing apparatus 100 transforms image data obtained by reading a document into an image file and sends an e-mail with the image file attached thereto via the computer network 700. The e-mail sent from the image processing apparatus 100 is stored in mail boxes in the e-mail server 400, and the computers 200a and 200b (clients) receive the e-mail from the respective mail boxes.

The image processing apparatus 100 sends the image data to the printer 300 as print data. The image processing apparatus 100 also sends the image file to the FTP server 500 under an FTP (file transfer protocol). Further, the image processing apparatus 100 sends the image data to the facsimile 600 as facsimile data.

Moreover, the image processing apparatus 100 is capable of executing a multicast transmission of image data which were transformed into various data formats. In executing a multicast transmission, the image processing apparatus 100 makes an e-mail including a first image file attached thereto and a subject showing a job ID serving as identification information for identifying the multicast transmission. Concurrently, the image processing apparatus 100 stores the job ID and the receivers of the multicast transmission in relative to each other. In this embodiment, a multicast transmission means sending data, transformed if necessary from an original format, to a plural number of receivers substantially at a time.

Figure 2:
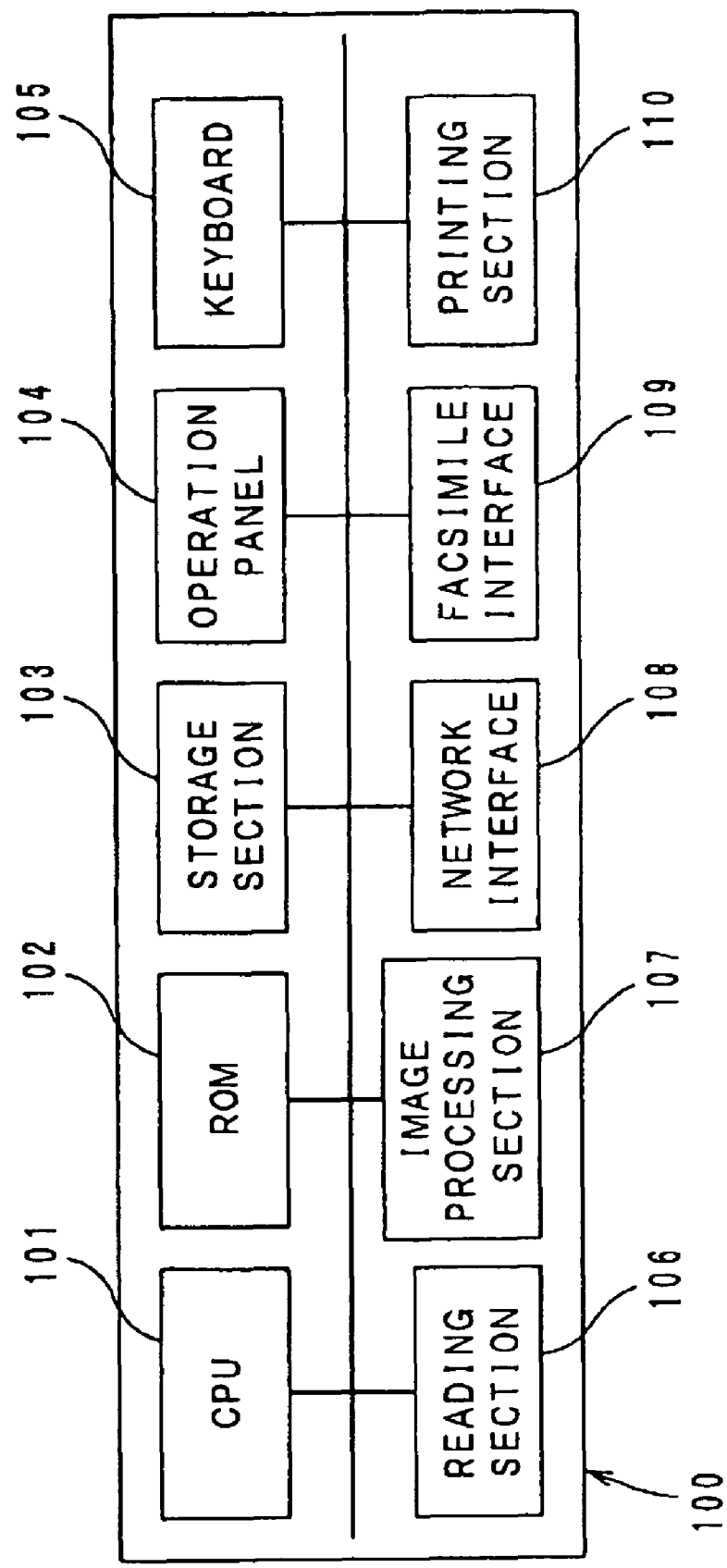
FIG. 2 is a block diagram of an exemplary structure of an image processing apparatus in the data communication system.

FIG. 2 is a block diagram showing an exemplary structure of the image processing apparatus 100. The image processing apparatus 100 comprises a CPU 101, a ROM 102, a storage section 103, an operation panel 104, a keyboard 105, a reading section 106, an image processing section 107, a network interface 108, a facsimile interface 109 and a printing section 110. These sections are connected to each other via buses.

The CPU 101 performs controls and operations. The ROM 102 stores programs therein. The storage section 103 comprises a RAM, for example, functioning as a working area to be temporarily stored with data and a hard disk to be stored with programs and data. The operation panel 104 receives various inputs and makes various displays. The operation panel 104 has a touch panel and other mechanical keys. The keyboard 105 is used for inputs of letters and codes.

The reading section 106 is a scanner engine which obtains image data by reading a document image. The image processing section 107 performs various kinds of image processing. The image processing includes, for example, a process of transforming image data obtained by the reading section 106 and data sent from other devices in reply to the image data into various formats suited for different communication protocols.

The network interface 108 is for communication via a computer network 700. Specifically, the network interface 108 is an interface for communication with the computers 200a and 200b, the printer 300, the e-mail server 400 and the FTP server 500. On the other hand, the facsimile interface 109 is for communication via the telephone line network 800, and more specifically, is an interface for communication with the facsimile 600. The printing section 110 prints an image on a recording sheet of, for example, paper in accordance with print data sent from the computers 200a, 200b, etc.

Next, the computers 200a and 200b, the printer 300, the e-mail server 400 and the FTP server 500 and the facsimile 600 are described. The computers 200a and 200b are of the same structure, and here, the computer 200a is described.

The computer 200a is capable of receiving an e-mail from the image processing apparatus 100 by a multicast transmission. Further, the computer 200a is capable of sending a second image file by a reply multicast transmission via the image processing apparatus 100 to the computer 200b, the printer 300, the FTP server 500 and the facsimile 600, which previously received the multicast transmission from the image processing apparatus 100. Specifically, for a reply multicast transmission, the computer 200a makes a reply e-mail including a second image file attached thereto and a subject including the job ID shown by the subject of the e-mail received from the image processing apparatus 100. Then, the computer 200a sends the reply e-mail to the image processing apparatus 100. From the job ID included in the subject of the reply e-mail, the image processing apparatus 100 recognizes the sender and the receivers of the multicast transmission identified by the job ID and accordingly designates receivers of the reply multicast transmission. Then, the image processing apparatus 100 executes a reply multicast transmission to the designated receivers, namely, the computer 200b, the printer 300, the FTP server 500 and the facsimile 600. In this embodiment, a reply multicast transmission means sending a reply from one of the receivers of a previously executed multicast transmission to the sender and the other receivers of the multicast transmission substantially at a time.

Figure 3:
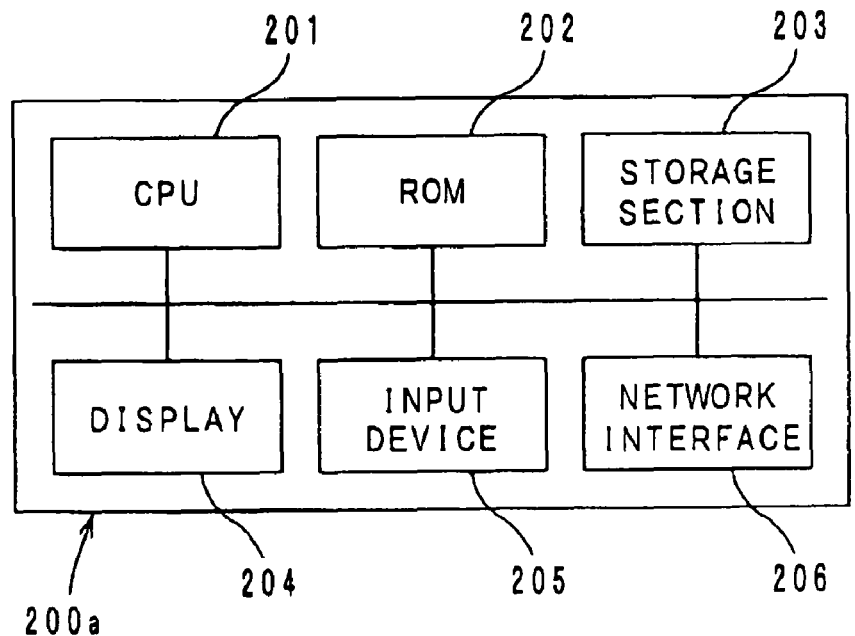
FIG. 3 is a block diagram of an exemplary structure of a computer in the data communication system.

FIG. 3 is a block diagram showing an exemplary structure of the computer 200a. The computer 200a comprises a CPU 201, a ROM 202, a storage section 203, a display section 204, an input section 205 and a network interface 206. The CPU 201 performs controls and operations. The ROM 202 stores programs therein. The storage section 203 comprises a RAM, for example, functioning as a working area to be temporarily stored with data and a hard disk to be stored with programs and data. In the hard disk, an e-mail software program, for example, Outlook Express (trade name) of Microsoft Inc. is installed so that generation and edition of e-mails, sending/receiving of e-mails, sending of reply e-mails, and storage and management of received e-mails can be executed. Also, a browser which permits communication with other devices under HTTP (hypertext Transfer Protocol) may be installed. The display section 204 displays various kinds of information.

The input section 205 is a pointing device such as a keyboard, a mouse, etc. The network interface 206 is for communication via the computer network 700.

The computers 200a, 200b, the e-mail server 400 and the FTP server 500 are substantially of the same structure except that the programs installed in the respective devices are different from each other. Specifically, the e-mail server 400 is installed with a software program for executing e-mail transmissions and management of e-mails in mail boxes. The FTP server 500 is installed with a software program for executing file transfers under a file transfer protocol.

Figure 4:
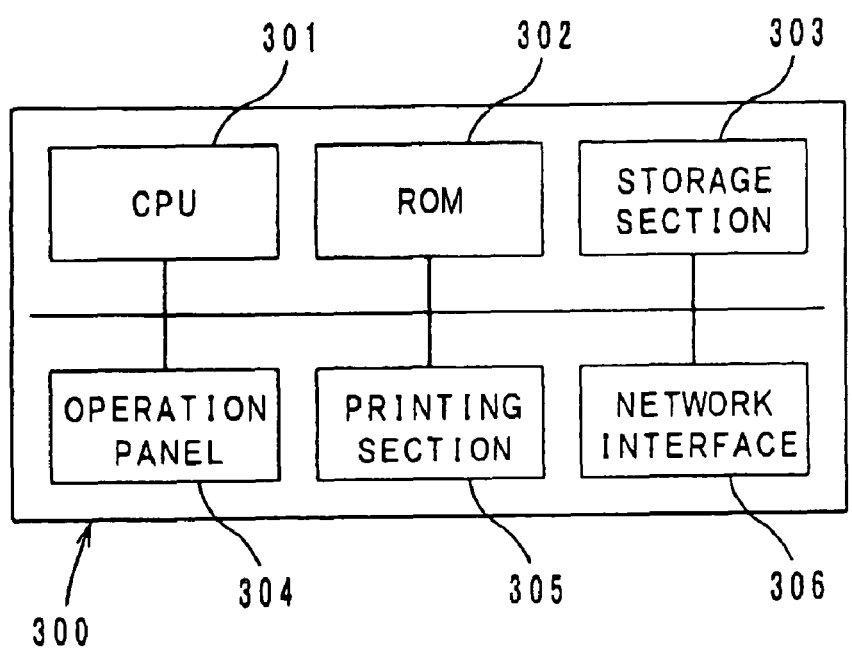
FIG. 4 is a block diagram of an exemplary structure of a printer in the data communication system.

FIG. 4 is a block diagram showing an exemplary structure of the printer 300. The printer 300 comprises a CPU 301, a ROM 302, a storage section 303, an operation panel 304, a printing section 305 and a network interface 306.

Figure 5:
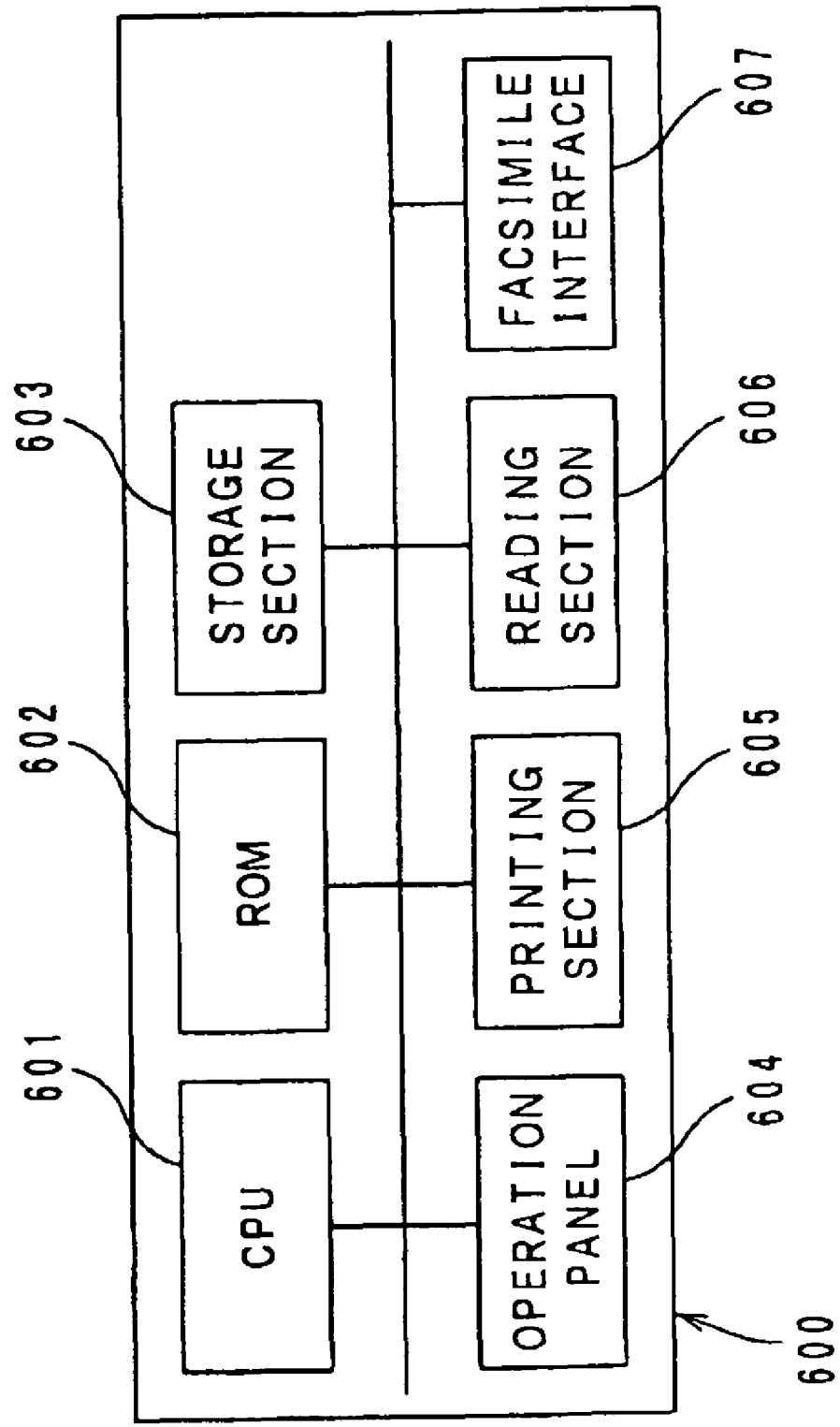
FIG. 5 is a block diagram of an exemplary structure of a facsimile in the data communication system.

FIG. 5 is a block diagram showing an exemplary structure of the facsimile 600. The facsimile 600 comprises a CPU 601, a ROM 602, a storage section 603, an operation panel 604, a printing section 605, a reading section 606 and a facsimile interface 607.

Operation of Data Communication System

Operation of the data communication system of the structure above is hereinafter described with reference to the accompanying drawings. The data communication system performs two procedures, a procedure wherein the image processing apparatus 100 executes a multicast transmission and a procedure wherein either the computer 200a or the computer 200b and the image processing apparatus 100 execute a reply multicast transmission in cooperation with each other. Here, a case wherein the user B commands a multicast transmission and the user A commands a reply multicast transmission is described.

Multicast Transmission

Figure 6:
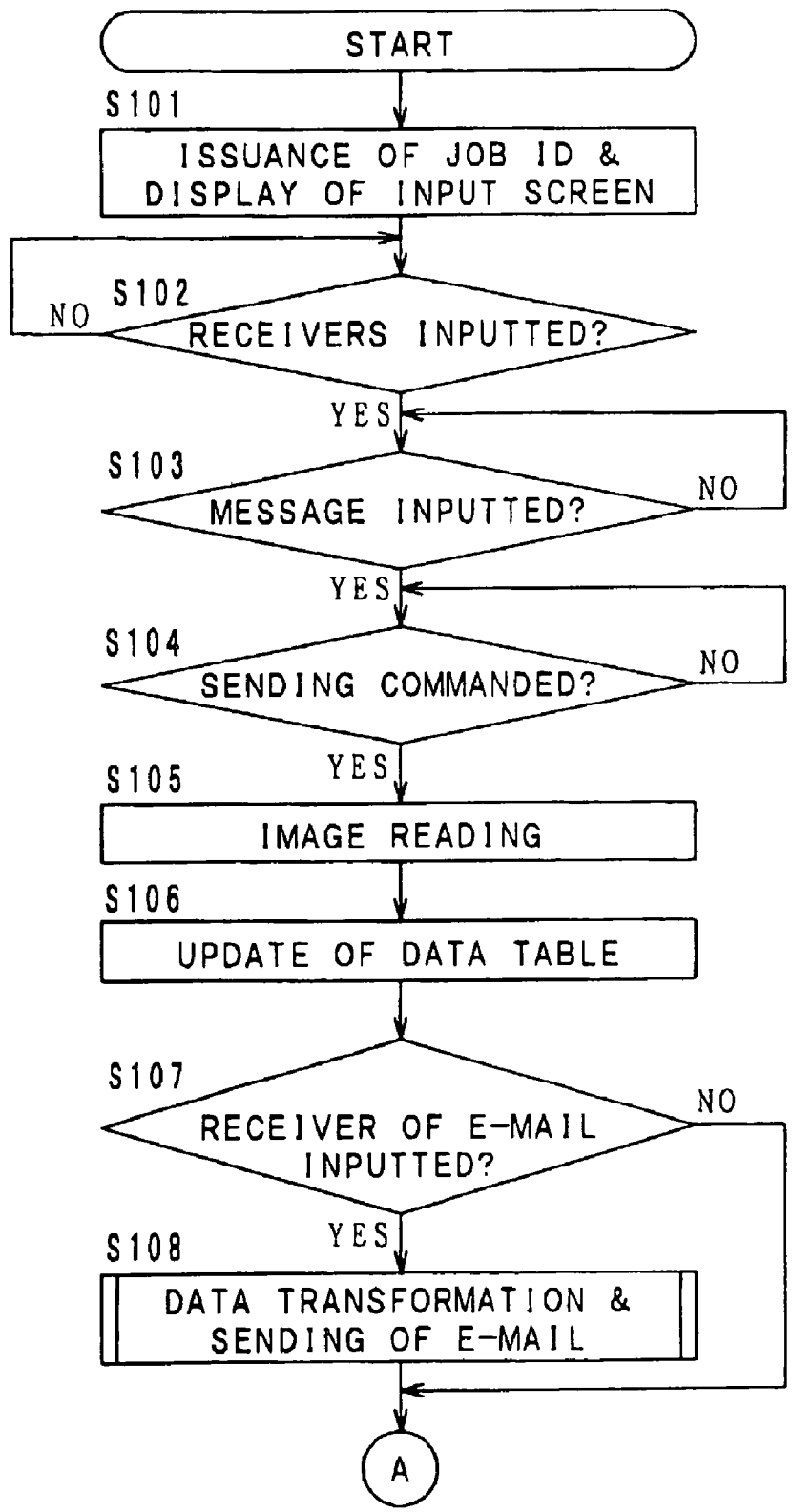
FIGS. 6 and 7 are flowcharts showing a procedure carried out by a CPU of the image processing apparatus for executing a multicast transmission.
Figure 7:
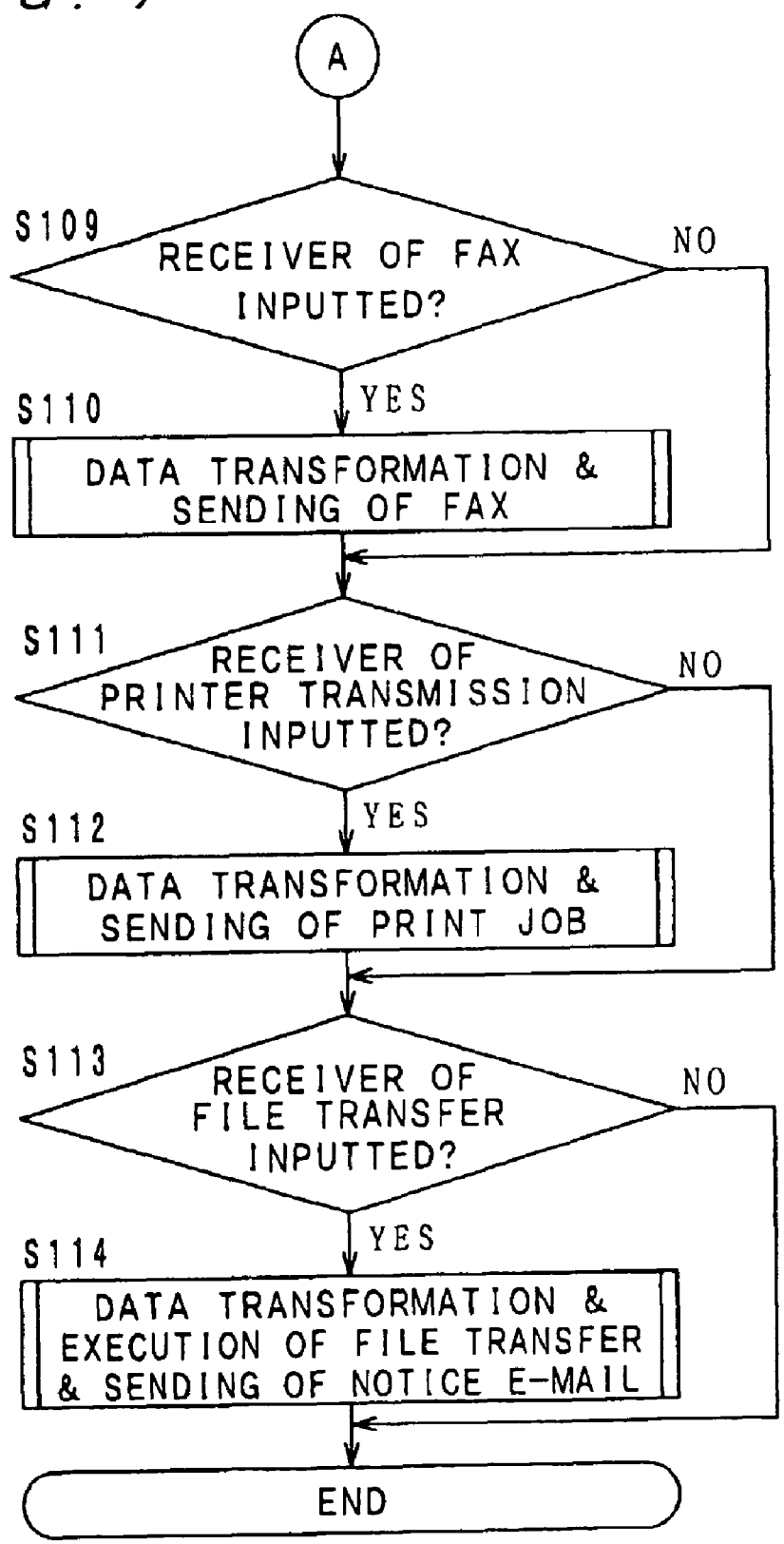

FIGS. 6 and 7 are flowcharts showing a procedure carried out by the CPU 101 when the image processing apparatus 100 executes a multicast transmission. The algorithm shown by the flowcharts in FIGS. 6 and 7 is stored in the ROM 102 or in the storage section 103 as a control program, and the algorithm is carried out by the CPU 101.

First, the user B moves to the image processing apparatus 100 and operates the operation panel 104 to command the CPU 101 to start the procedure for a multicast transmission. The CPU 101 issues a job ID for the multicast transmission and commands the operation panel 104 to display an input screen (step S101). FIG. 8 shows an exemplary input screen to promote the user B to input receivers. The input screen comprises a subject input section, a sender input section, four receiver input sections, in which receivers under four kinds of transmission protocols (e-mail, facsimile, printer and file transfer) are inputted, and a message input section. In the subject input section, the job ID is automatically displayed. Here, the image processing apparatus 100 issues a job ID "JOB ID 1" for the multicast transmission, and "JOB ID 1" is displayed in the subject input section. Different job IDs are issued for individual multicast transmissions, and for example, every time a multicast transmission is commanded, the number after "JOB ID" gains an increment.

The CPU 101 stands by while detecting whether the sender and the receivers of the multicast transmission have been inputted (step S102). On the input screen, the user B inputs the e-mail address of the computer 200*b* in the sender input section and inputs receivers in the receiver input sections for necessary transmissions. As the receiver of an e-mail transmission, an e-mail address is inputted. As the receiver of a facsimile transmission, a facsimile number is inputted. As the receiver of a printer transmission, an IP address is inputted. As the receiver of a file transfer, an address of an FTP server is inputted. In executing a file transfer to the FTP server, a notice e-mail is sent so as to notify execution of a file transfer and the address of the FTP server to a user of the FTP server, and therefore, as the receiver of a file transfer, further, a receiver of the notice e-mail is inputted. When the user B has completed filling in the receiver input sections, the processing goes to step S103.

After completion of inputs in the receiver input sections, the CPU 101 stands by while the user B has inputted a message (step S103). The user B writes a message to the receivers of the multicast transmission in the message input section. For example, in the case of FIG. 8, a message "Enclosed herewith is a material for the conference." is written in the message input section. When the user B has completed writing a message, the processing goes to step S104.

After completion of writing of a message, the CPU 101 stands by while judging whether the user B has made a send command (step S104). The user makes a send command specifically by pressing a "SEND" button in the input screen shown by FIG. 8. When a send command has been made, the processing goes to step S105.

Next, the CPU 101 commands the reading section 106 to read a document to obtain first image data (step S105) and issues a data name for the first image data. The data name is, for example, a combination of a year, a month, a date, a time, a minute and a second, such as "20070207151058.pdf".

Then, the CPU 101 updates a data table as shown by FIG. 9. Specifically, the CPU 101 makes history information on the multicast transmission, including the job ID, the storage section stored with the image data, the sender and the receivers, and records the history information in the data table (step S106). The data table is stored in the storage section 103 and manages job IDs, memory areas stored with data, senders and receivers of individual multicast transmissions as history information. The memory area stored with data shows the area in the storage section 103 stored with the data. Also, the area stored with the data may be in a server provided outside of the image processing apparatus 100, not in the storage section 103. A plural number of receivers are recorded as the receivers of a multicast transmission, and the receivers are an e-mail address, a facsimile number, an IP address and an address of a FTP server, etc.

Next, the CPU 101 judges whether the receiver input section for an e-mail transmission is filled in (step S107). When the receiver input section for an e-mail transmission is filled in, the processing goes to step S108. When no receivers are inputted in the receiver input section for an e-mail transmission, the processing goes to step S109.

Figure 10:
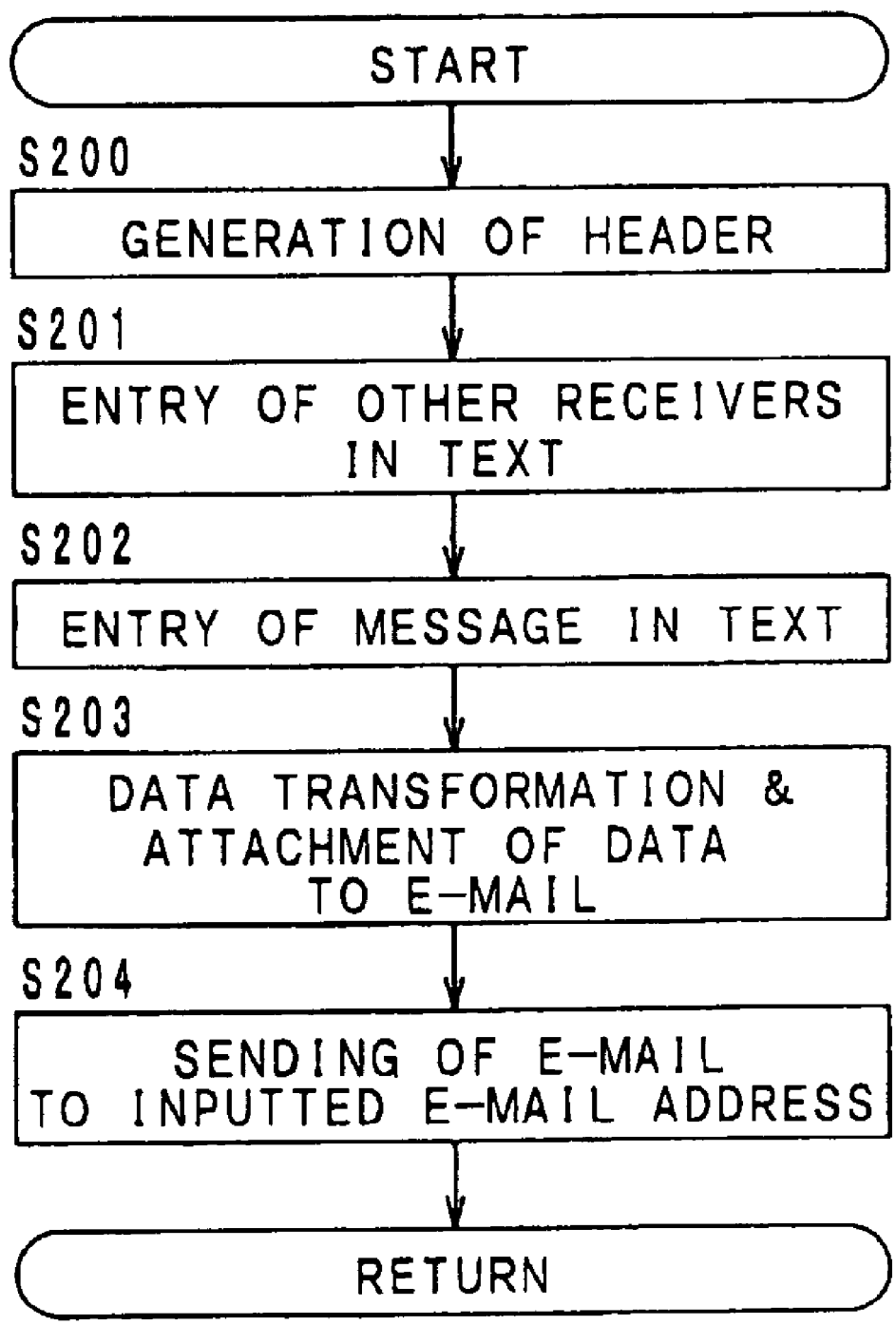
FIG. 10 is a flowchart showing a procedure carried out by the CPU of the image processing apparatus for sending an e-mail.

When the receiver input section for an e-mail transmission is filled in, the CPU 101 makes an e-mail, and the first image data, which were obtained at step S105, are transformed into an image file and attached to the e-mail as a first image file. Then, the CPU 101 commands the network interface 108 to send the e-mail with the first image file attached (step S108). Now, referring to FIG. 10, the process at step S108 is described in more detail. FIG. 10 shows a flowchart showing a procedure carried out by the CPU 101 at step S108 when the image processing apparatus 100 sends an e-mail.

The CPU 101 makes an e-mail at steps S200 to S203. First, the CPU 101 makes a header of the e-mail (step S200). The header is made in accordance with the data inputted on the input screen, in the subject input section, the sender input section and the receiver input section for an e-mail transmission. Specifically, the CPU 101 enters the sequence of letters and numbers inputted in the subject input section after "Subject" in the header, enters the e-mail address inputted in the sender input section after "From" in the header and enters the e-mail address inputted in the receiver input section for an e-mail transmission after "To" in the header. Further, the CPU 101 enters the e-mail address of the image processing apparatus 100 after "Reply-To" in the header. The "Reply-To" shows the e-mail address to which a reply e-mail is to be sent.

Next, in the text of the e-mail, the CPU 101 enters information on the other receivers of the multicast transmission (step S201). Thereby, the receiver of the e-mail will be informed of the other receivers.

Next, the CPU 101 adds the message written in the message input section to the text of the e-mail (step S202). Further, the CPU 101 transforms the first image data into a first image file and attaches the first image file to the e-mail (step S203). Here, for example, first image data in a bit map format, which were obtained by reading a document, are transformed into a first image file in JPEG or PDF (portable document format). Further, the first image file is transformed into ASCII by a mail extension function, such as MIME (multipurpose internet mail extension), and is attached to the e-mail.

Finally, the CPU 101 sends the e-mail to the e-mail address inputted in the receiver input section for an e-mail transmission via the network interface 108 (step S204).

Now, the e-mail sent at step S204 is described. FIG. 11 shows an example of the e-mail sent to the user A (A@*.co.jp) by the multicast transmission recorded in the data table of FIG. 9** as "JOB ID 1".

Referring to FIG. 11, in the text of the e-mail, the facsimile number of the facsimile 600 used by the user C, and the IP address of the printer 300 used by the user D which are the other receivers of the multicast transmission are automatically added. Further, the address of the FTP server 500 is added.

Also, the e-mail includes an attachment button. When this attachment button is pressed, the first image data are displayed. That is all about the process at step S108. Thereafter, the processing goes to step S109 shown in FIG. 7.

The CPU 101 judges whether the receiver input section for a facsimile transmission is filled in (step S109). When the receiver input section for a facsimile transmission is filled in, the processing goes to step S110. When no receivers are inputted in the receiver input section for a facsimile transmission, the processing goes to step S111.

Figure 12:
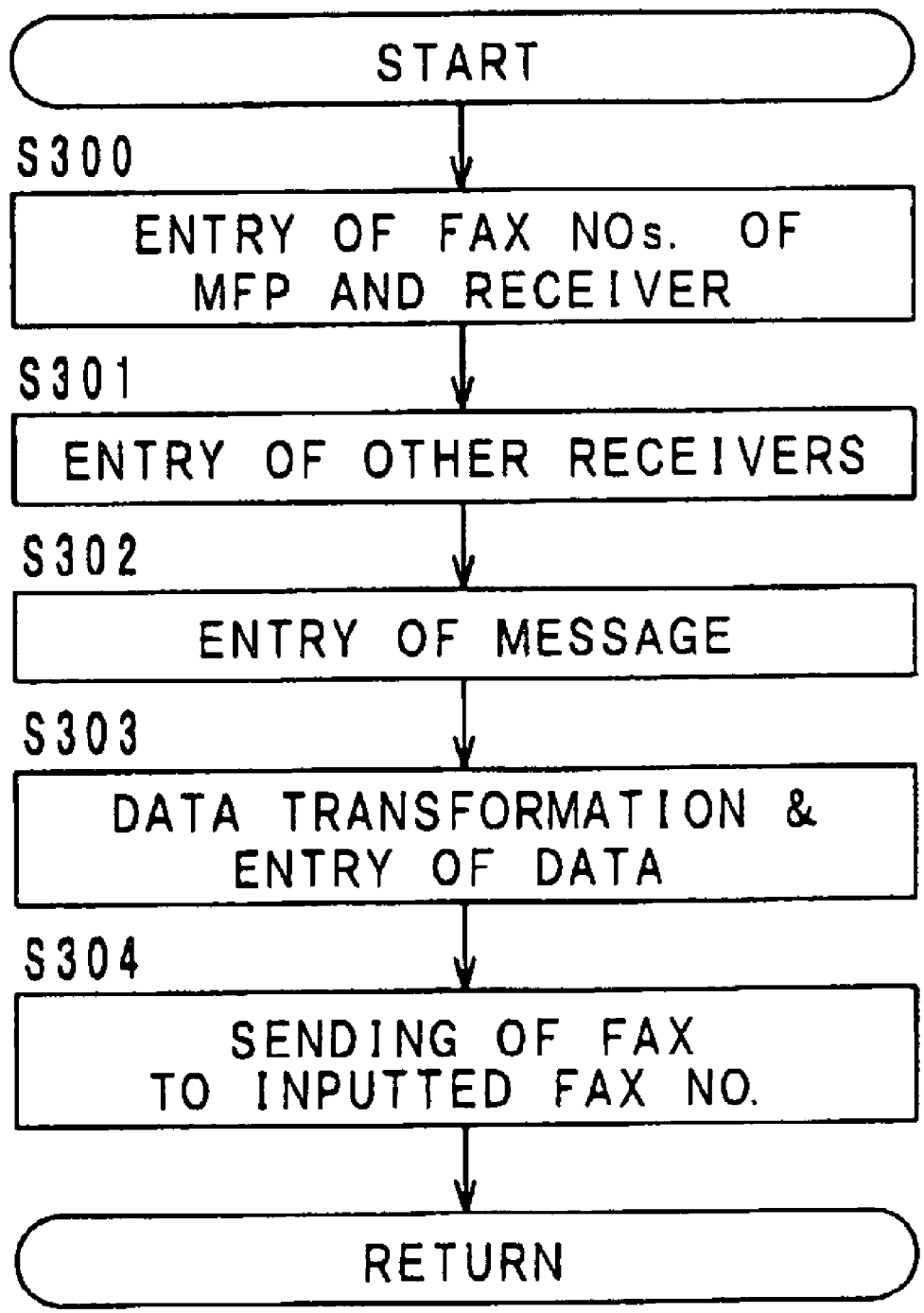
FIG. 12 is a flowchart showing a procedure carried out by the CPU of the image processing apparatus for sending a facsimile.

When the receiver input section for a facsimile transmission is filled in, the CPU 101 transforms the first image data, which were obtained at step S105, into facsimile data suited for a facsimile transmission and commands the facsimile interface 109 to send the facsimile data (step S110). Now, referring to FIG. 12, the process at step S110 is described in more detail. FIG. 12 is a flowchart showing a procedure carried out by the CPU 101 when the image processing apparatus 100 sends a facsimile.

The CPU 101 enters the facsimile number of the apparatus which is to send a facsimile, that is, the image processing apparatus 100 and the facsimile number of the receiver in the first page (step S300). The process at step S300 is the same as the process carried out for ordinary facsimile sending, and a detailed description of this process is omitted.

Next, the CPU 101 enters the other receivers of the multicast transmission in the first page (step S301). Thereby, the receiver of the facsimile will be informed of the other receivers of the multicast transmission. Further, the CPU 101 enters the message written in the message input section in the first page of the facsimile (step S302).

Next, the CPU 101 transforms the first image data into a format suited for a facsimile transmission and enters the transformed data in the second and subsequent pages (step S303). At this time, for example, the image data obtained by reading a document is transformed into data of G3 (group 3) standard usable for an analog line or data of high-quality G4 standard (group 4) usable for an ISDN line.

Next, the CPU 101 commands the facsimile interface 109 to send the facsimile to the designated facsimile number (step S304).

Now, the facsimile sent at step S304 is described. FIG. 13 shows an example of the facsimile sent to the user C (0312345678) by the multicast transmission recorded in the data table of FIG. 9 as "JOB ID 1".

On the first page of the facsimile, the other receivers of the multicast transmission, namely, the e-mail address of the user A and the IP address of the printer 300 used by the user D are automatically written. Further, the address of the FTP server 500 is added. That is all about the process at step S110. Thereafter, the processing goes to step S111 shown in FIG. 7.

The CPU 101 judges whether the receiver input section for a printer transmission is filled in (step S111). When the receiver input section for a printer transmission is filled in, the processing goes to step S112. When no receivers are inputted in the receiver input section for a printer transmission, the processing goes to step S113.

Figure 14:
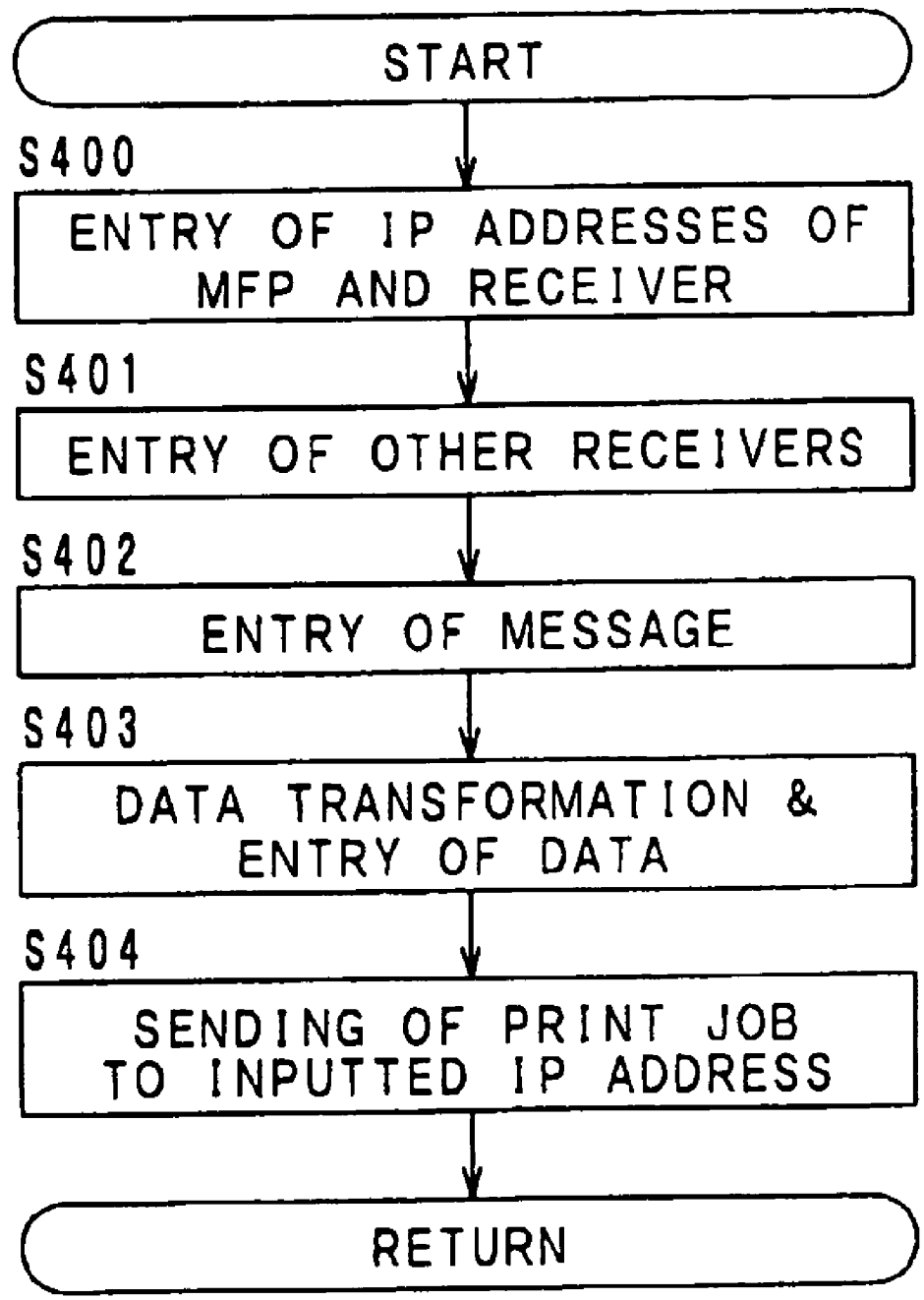
FIG. 14 is a flowchart showing a procedure carried out by the CPU of the image processing apparatus for sending a print job.

When the receiver input section for a printer transmission is filled in, the CPU 101 transforms the first image data, which were obtained at step S105, into print data suited for sending of a print job. Now, referring to FIG. 14, the process at step S112 is described in more detail. FIG. 14 is a flowchart showing a procedure carried out by the CPU 101 when the image processing apparatus 100 sends a print job.

The CPU 101 enters the IP address of the apparatus which is to send a print job, that is, the image processing apparatus 100 and the IP address of the receiver, that is, the printer 300 in the first page of the print job (step S400). If the IP address of a device becomes apparent from the name of the device on the network, the name of the image processing apparatus 100 and the name of the printer 300 may be added instead of their IP addresses.

Next, the CPU 101 enters the other receivers of the multicast transmission in the first page (step S401). Thereby, the receiver of the print job will be informed of the other receivers of the multicast transmission. Further, the CPU 101 adds the message written in the message input section to the first page (step S402).

Next, the CPU 101 transforms the first image data into print data suited for sending of a print job (step S403). At this time, for example, the first image data are transformed into data in PDL (page description language), and the data in PDL are entered in the second and subsequent pages. The PDL may be, for example, Postscript (trade name).

Then, the CPU 101 sends the print job to the printer 300 with the designated IP address (step S404). That is all about the process at step S112. Thereafter, the processing goes to step S113.

The CPU 101 judges whether an address of an FTP server is inputted in the receiver input section for a file transfer (step S113). When an address of an FTP server is inputted in the receiver input section for a file transfer, the processing goes to step S114. When no addresses are inputted in the receiver input section for a file transfer, this procedure is completed.

Figure 15:
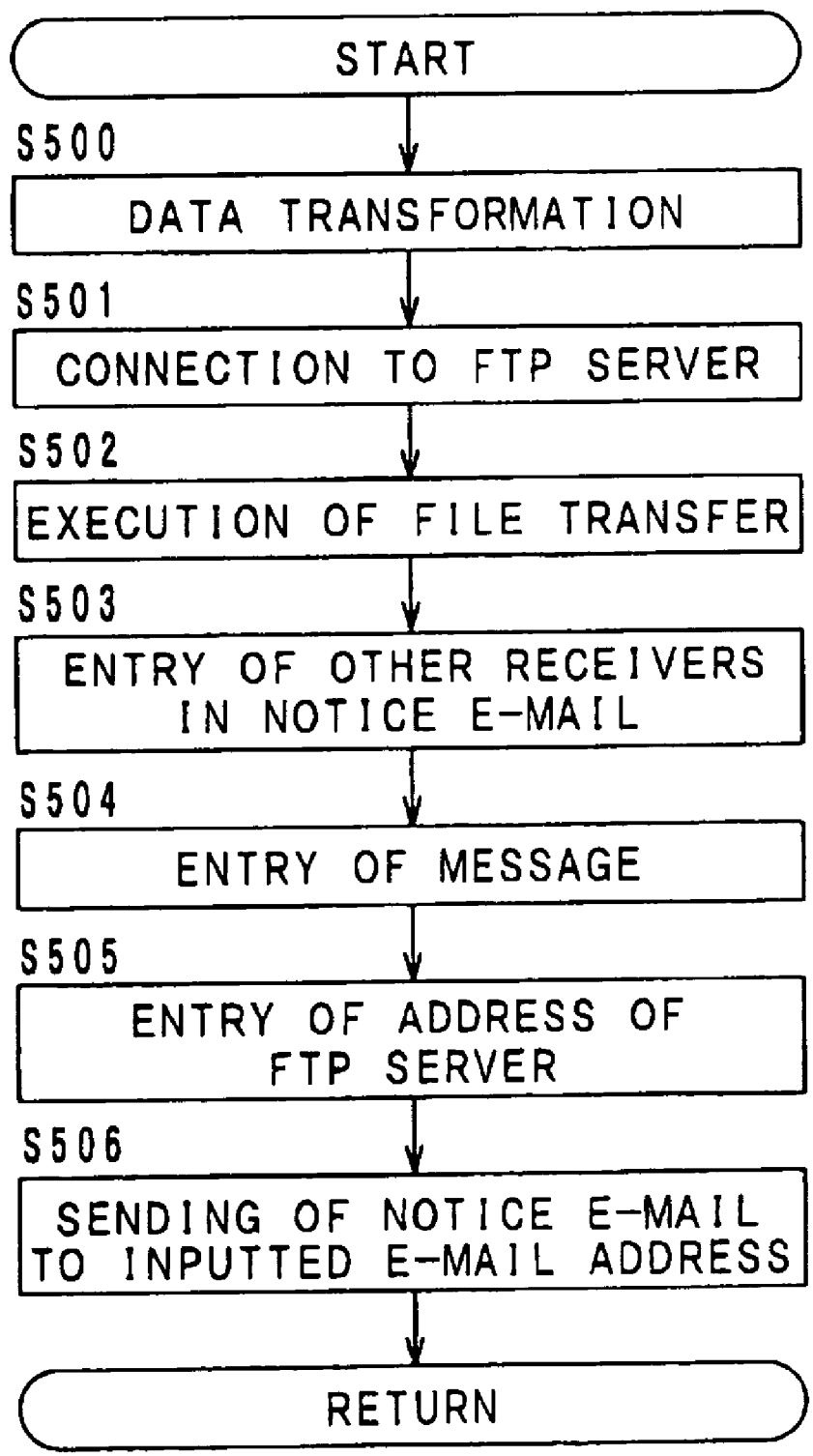
FIG. 15 is a flowchart showing a procedure carried out by the CPU of the image processing apparatus for executing a file transfer to an FTP server and sending a notice e-mail.

When an address of an FTP server is inputted, the CPU 101 transforms the first image data, which were obtained at step S105, into a format suited for a file transfer and executes a file transfer (step S114). Also, the CPU 101 sends a notice e-mail to the user E of the FTP server 500. Now, referring to FIG. 15, the process at step S114 is described in more detail. FIG. 15 is a flowchart showing a procedure carried out by the CPU 101 when the image processing apparatus 100 executes a file transfer and sends a notice e-mail.

The CPU 101 transforms the first image data into a GIF (graphic interchange format) file or a TIFF (tagged image file format) file suited for a file transfer (step S500).

Next, the CPU 101 makes a connection to the FTP server 500 (step S501), and the CPU 101 sends the image file to the FTP server 500 (step S502).

Next, the CPU 101 enters the other receivers of the multicast transmission in the text of a notice e-mail (step S503). Also, the CPU 101 enters the message written in the message input section shown by FIG. 8 in the text of the notice e-mail (step S504).

Further, the CPU 101 adds the address of the FTP server 500 to the text of the notice e-mail (step S503). Thereby, the user E of the FTP server 500 will be informed that a file transfer to the FTP server has been executed.

Then, the CPU 101 commands the network interface 108 to send the notice e-mail to the designated e-mail address (step S506).

Now, the notice e-mail sent at step S506 is described. FIG. 16 is an example of the notice e-mail sent to the user E (E@***.co.jp) by the multicast transmission recorded in the data table of FIG. 9 as "JOB ID 1". In the text of the notice e-mail, the other receivers of the multicast transmission are automatically written. Thus, the process at step S114 is completed, and the procedure for a multicast transmission is completed.

As described above, in the procedure for a multicast transmission according to the embodiment, the image processing apparatus 100 transforms first image data obtained by reading a document into various formats, such as a format suited for an attachment to an e-mail, a format for a facsimile, etc., and sends the data in various formats substantially at a time. At this time, the sender and the receivers of the multicast transmission and the job ID identifying the multicast transmission are recorded in the data table shown by FIG. 9 as history information. The history information is used in executing a reply multicast transmission as described below.

Reply Multicast Transmission

Next, a reply multicast transmission executed in the data communication system according to the embodiment is described. First, the user A of the computer 200a receives the e-mail sent by a multicast transmission by using an e-mail software program. The user A, by using the e-mail software program, makes a reply e-mail with a second image file attached thereto and sends the reply e-mail to the image processing apparatus 100. At this time, in the subject of the reply e-mail, a sequence of letters and numbers including the job ID is entered after "RE:" which means this is a reply e-mail. When the image processing apparatus 100 receives the reply e-mail, the image processing apparatus 100 specifies receivers of the reply multicast transmission with reference to the job ID included in the subject of the reply e-mail and the data table shown by FIG. 9. Then, the image processing apparatus 100 sends the second image file attached to the reply e-mail by a reply multicast transmission. A procedure for executing a reply multicast transmission will be described with reference to the accompanying drawings.

Figure 17:
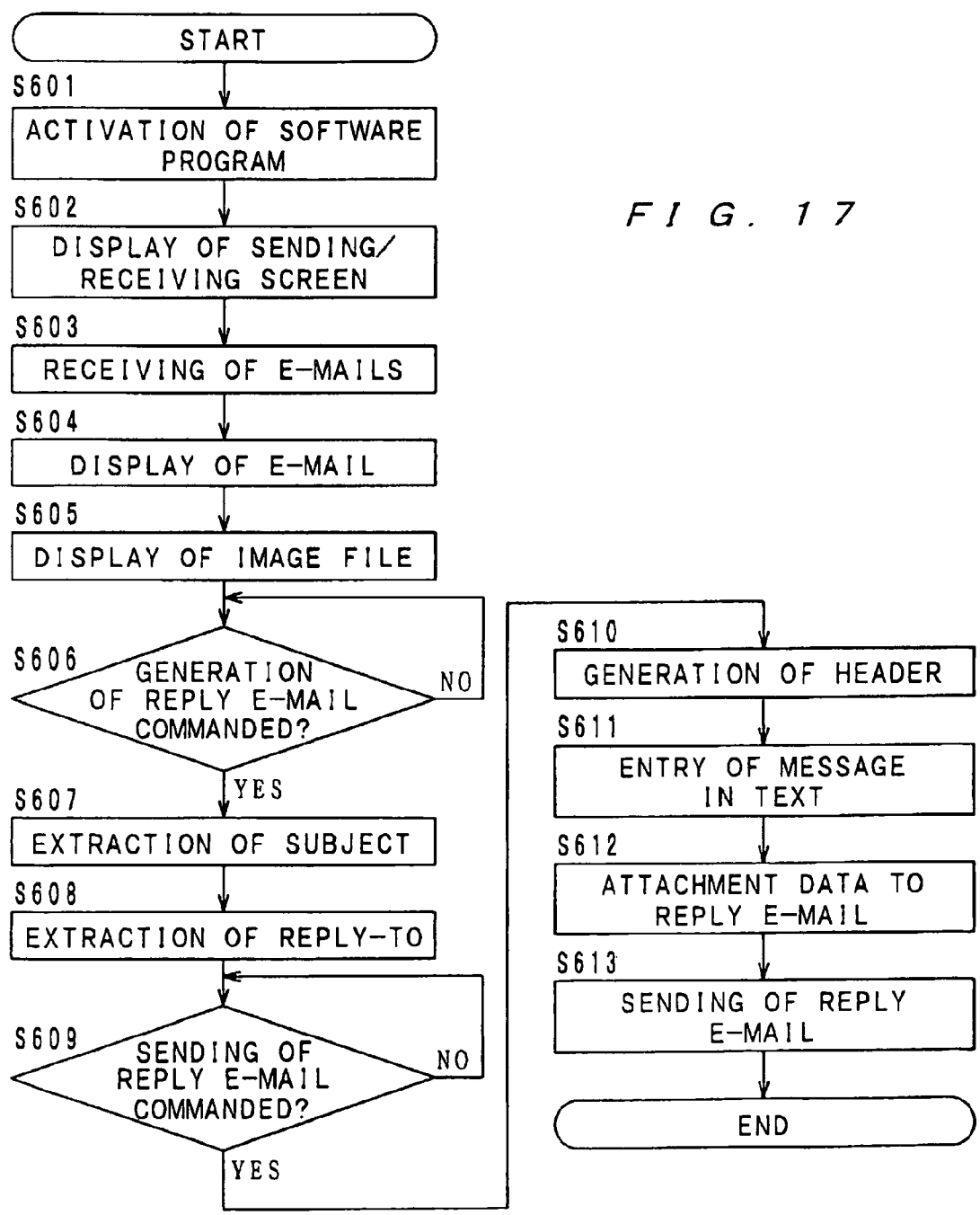
FIG. 17 is a flowchart showing a procedure carried out by a CPU of a computer for sending a reply e-mail.

Referring to FIGS. 17, 18 and 19, sending of a reply e-mail from the computer 200a to the image processing apparatus 100 is described. FIG. 17 is a flowchart showing a procedure carried out by the CPU 201 when the computer 200a sends a reply e-mail. FIG. 18 is an illustration of a sending/receiving screen controlled by the e-mail software program installed in the computer 200a. FIG. 19 is an example of the reply e-mail sent at step S609 in the flowchart of FIG. 17.

First, the user A activates the e-mail software program by operating the input section 205 (step S601). When the e-mail soft ware program starts, the CPU 201 commands the display section 204 to display a sending/receiving screen as shown by FIG. 18 (step S602). In this moment, the computer 200a has not received the e-mail identified by "JOB ID 1" yet, and the e-mail is not listed on the screen.

Next, the CPU 201 commands the network interface 206 to receive e-mails (step S603) and stores the received e-mails in the storage section 203. At this time, the e-mail identified by "JOB ID 1" is received and is added to the list on the screen shown by FIG. 18.

Next, the user A operates the input section 205 to open the e-mail with a subject of "JOB ID 1", and the CPU 201 commands the display section 204 to display the text of the e-mail with a subject of "JOB ID 1" shown by FIG. 11 (step S604). Thereafter, the user A clicks the attachment button in the text of the e-mail so that the display section 204 will display the attached file. Accordingly, the CPU 201 commands the display section 204 to display the first image file attached to the e-mail (step S605).

After displaying the first image file, the CPU 201 stands by while judging the user A has made a command to make a reply e-mail (step S606). When the user A operates the input section 205 to click a reply button in the sending/receiving screen as shown by FIG. 18, the CPU 201 judges that the user A has made a command to make a reply e-mail. Then, the processing goes to step S607.

When a reply command has been made, the CPU 201 extracts the subject from the e-mail (step S607). Referring to FIG. 18, the subject of the e-mail is "JOB ID 1". The CPU 201 further extracts the address for a reply e-mail from the e-mail (step S608). Here, in the e-mail, as shown by FIG. 11, the e-mail address of the image processing apparatus 100 is written after "Reply-To". Therefore, the CPU 201 extracts the e-mail address "mfp@***.co.jp" of the image processing apparatus 100 from the e-mail as the receiver of a reply e-mail.

After extracting the address for a reply e-mail, the CPU 201 commands the display section 204 to display a reply e-mail writing screen as shown by FIG. 19. By this moment, as seen in the screen, the CPU 201 has entered the e-mail address "mfp@*.co.jp" of the image processing apparatus 100 after "To", the e-mail address "A@*.co.jp" of the user A after "From" and "RE: JOB ID 1" as the subject. The subject may be protected from being altered by the user. At this time, nothing is inputted in the text of the reply e-mail.

Then, the user A operates the input section 205 to write a message in the text of the e-mail as shown by FIG. 19. Further, the user A selects a second image file to be sent by a reply multicast transmission and attaches the second image file to the reply e-mail. Thus, writing of a replay e-mail is completed. The second image file attached to the reply e-mail may be the first image file or may be an image file different from the first image file. Also, an edited version of the first image file may be attached to the reply e-mail, and no image files may be attached to the reply e-mail.

While the user A is writing a reply e-mail, the CPU 201 stands by while judging whether the user A has made a command to send the reply e-mail (step S609). When the user A has made a reply sending command by use of the input section 205, the processing goes to step S610.

When a reply sending command has been made, the CPU 201 makes a replay e-mail at steps S610 to S612. First, the CPU 201 makes a header of the reply e-mail (step S610). The header is made based on the matters inputted on the reply e-mail writing screen shown by FIG. 19. More specifically, the CPU 201 enters "RE: JOB ID 1" in the header as the subject, "A@*.co.jp" in the header after "From" (as the sender) and "mfp@*.co.jp" in the header after "To" (as the receiver).

Next, the CPU 201 enters the message written on the screen shown by FIG. 19 in a text of the reply e-mail (step S611). Further, the CPU 201 attaches the second image file to the reply e-mail (step S612).

Then, the CPU 201 commands the network interface 206 to send the reply e-mail to the e-mail address entered in the header as the receiver (step S613). Specifically, the CPU 201 sends the reply e-mail to the image processing apparatus 100. In this way, a reply e-mail is sent from the computer 200a to the image processing apparatus 100.

Figure 20:
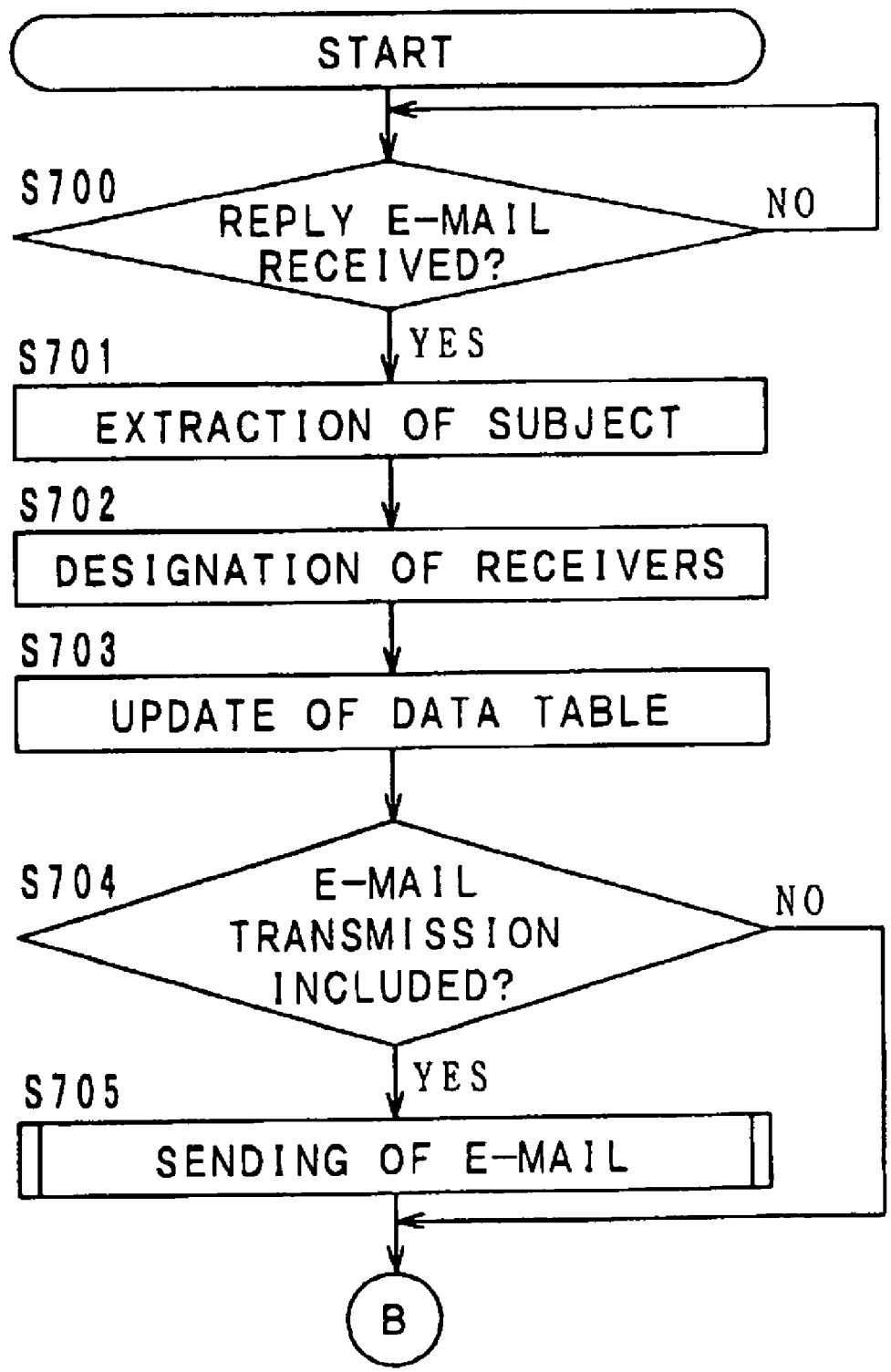
FIGS. 20 and 21 are flowcharts showing a procedure carried out by the CPU of the image processing apparatus for executing a reply multicast transmission.
Figure 21:
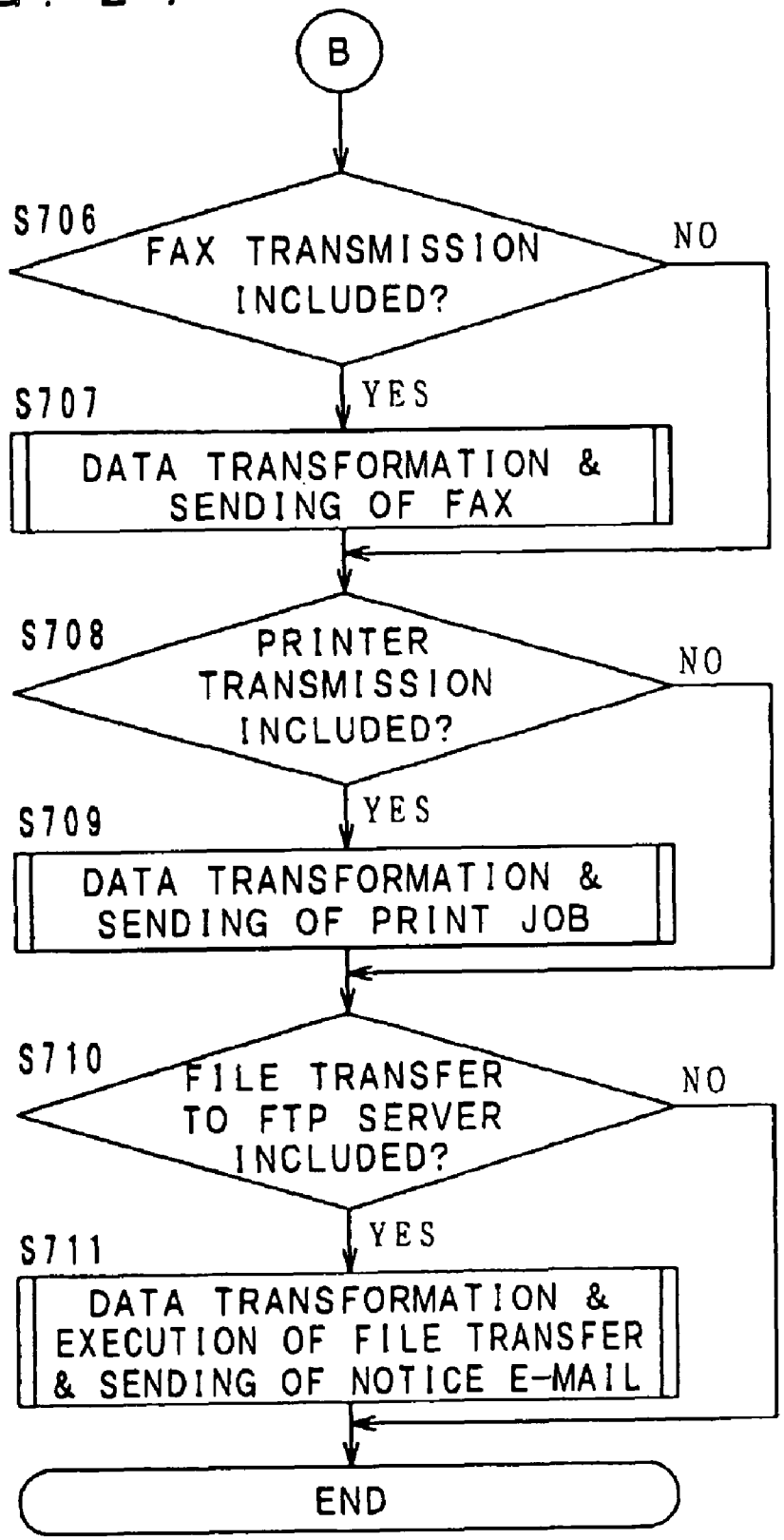

Next, referring to FIGS. 20, 21 and 22, a reply multicast transmission executed by the image processing apparatus 100 is described. FIGS. 20 and 21 are flowcharts showing a procedure carried out by the CPU 101 when the image processing apparatus 100 executes a reply multicast transmission. FIG. 22 shows the data table.

The CPU 101 stands by while detecting whether the network interface 108 has received a reply e-mail (step S700). When the network interface 108 has received a reply e-mail, the processing goes to step S701.

When the network interface 108 has received a reply e-mail, the CPU 101 stores the reply e-mail in the storage section 103 and extracts the subject from the reply e-mail (step S701). In the case of the reply e-mail shown by FIG. 19, the subject is "RE: JOB ID 1".

Next, the CPU 101 searches the data table shown by FIG. 9 for "JOB ID 1" which is obtained by deleting "RE:" from the extracted subject and thereby recognizes the sender and the receivers of the multicast transmission identified by "JOB ID 1" (step S702). Then, the CPU 101 designates the sender and the receivers of the multicast transmission except the sender of the reply multicast transmission as receivers of the reply multicast transmission. In this embodiment, because the sender of the reply multicast transmission is the user A, the e-mail address of the user B, the facsimile number of the facsimile 600 used by the user C, the IP address of the printer 300 used by the user D and the address of the FTP server 500 are designated as receivers of the reply multicast transmission.

Next, the CPU 101 updates the data table to record the reply multicast transmission (step S703). As shown by FIG. 22, specifically, the CPU 101 records "RE: JOB ID 1" as the subject of the reply multicast transmission, records the e-mail address of the user A as the sender of the reply multicast transmission, and records the e-mail address of the user B, the facsimile number of the facsimile 600 used by the user C, the IP address of the printer 300 used by the user D and the address of the FTP server 500 as the receivers of the reply multicast transmission.

Subsequently, with reference to the updated data table shown by FIG. 22, the CPU 101 judges whether the reply multicast transmission includes an e-mail transmission (step S704). When an e-mail transmission is included, the processing goes to step S705. When an e-mail transmission is not included, the processing goes to step S706.

When the reply multicast transmission includes an e-mail transmission, the CPU 101 makes an e-mail, attaches the second image file to the e-mail and commands the network interface 108 to send the e-mail (step S705). The process carried out by the CPU 101 at step S705 is the same as the process at step S108 shown in FIG. 6, except that transformation of image data into an image file is not necessary at step S705, and a detailed description of this process is omitted. Thereafter, the processing goes to step S706.

With reference to the updated data table shown by FIG. 22, the CPU 101 judges whether the reply multicast transmission includes a facsimile transmission (step S706). When a facsimile transmission is included, the processing goes to step S707. When a facsimile transmission is not included, the processing goes to step S708.

When the reply multicast transmission includes a facsimile transmission, the CPU 101 transforms the second image file into facsimile data suited for facsimile sending and commands the facsimile interface 109 to send the facsimile data (step S707). The process carried out by the CPU 101 at step S707 is the same as the process at step S110 shown in FIG. 7, except that an image file, not image data, is transformed into facsimile data at step S707, and a detailed description of this process is omitted.

With reference to the updated data table shown by FIG. 22, the CPU 101 judges whether the reply multicast transmission includes a printer transmission (step S708). When a printer transmission is included, the processing goes to step S709. When a printer transmission is not included, the processing goes to step S710.

When the reply multicast transmission includes a printer transmission, the CPU 101 transforms the second image file into print data and sends the print data as a print job (step S709). The process carried out by the CPU 101 at step S709 is the same as the process at step S112 shown in FIG. 7, except that an image file, not image data, is transformed into print data at step S709, and a detailed description of this process is omitted. Thereafter, the processing goes to step S710.

With reference to the updated data table shown by FIG. 22, the CPU 101 judges whether the reply multicast transmission includes a file transfer to a FTP server (step S710). When a file transfer is included, the processing goes to step S711. When a file transfer is not included, the processing is completed.

When the reply multicast transmission includes a file transfer, the CPU 101 transforms the second image file into a format suited for a file transfer to a server and executes a file transfer (step S711). The CPU 101 also sends a notice e-mail. The process carried out by the CPU 101 at step S711 is the same as the process at step S114 shown in FIG. 7, except that an image file, not image data, is transformed into a format suited for a file transfer, and a detailed description of this process is omitted. Thereafter, the processing goes to step S710. Thus, the CPU 101 completes the procedure for executing the reply multicast transmission.

In the data communication system according to this embodiment, as described above, the image processing apparatus 100 issues a job ID for each multicast transmission and stores the job ID, the sender of the multicast transmission and the receivers of the multicast transmission in a data table. Then, when one of the receivers, for example, the computer 200*a* sends a reply e-mail including the job ID for the purpose of executing a reply multicast transmission, the image processing apparatus 100 can designate receivers of the reply multicast transmission with reference to the data table. Thus, in the inventive system, in executing a reply multicast transmission via the image processing apparatus 100, the user A of the computer 200*a* does not need to do troublesome work, such as selecting receivers, etc.

In the data communication system according to this embodiment, the image processing apparatus 100 designates receivers of a reply multicast transmission and also transforms data into formats suited for individual communication protocols of the receivers. Therefore, even when the receivers of the reply multicast transmission are of various communication protocols, the user of the computer 200*a* only must send a reply e-mail to the image processing apparatus 100 without doing troublesome work, such as inputting receivers in relation to the individual communication protocols, etc.

Further, in the data communication system according to this embodiment, a job ID is included in an e-mail sent by a multicast transmission as a subject, and in sending a reply e-mail, the user A of the computer 200*a* can enter the job ID in the reply e-mail only by clicking a reply button. Thus, in the inventive system, the user A can command a reply multicast transmission only by performing a similar operation to an operation for sending of an ordinary reply e-mail. According to e-mail software programs such as Outlook Express (trade name), etc., generally, in replying to an e-mail, a sequence of letters and numbers included in the e-mail as the subject is automatically entered in the subject of the reply e-mail, after "RE:".

In this embodiment, operation of the data communication system to execute a reply multicast transmission in reply to a multicast transmission has been described. In the data communication system, a further reply multicast transmission in reply to a reply multicast transmission is also possible. For example, after the computer 200*b* receives a reply e-mail from the computer 200*a* by a reply multicast transmission, the computer 200*b* can make a further reply e-mail in reply to the reply e-mail sent from the computer 200*a*. Then, by sending the further reply e-mail to the image processing apparatus 100, the user B of the computer 200*b* can command the image processing apparatus 100 to execute a reply multicast transmission.

In the data communication system according to this embodiment, the image processing apparatus 100 may judge whether the computer 200*a* which has sent a reply e-mail is authorized to execute a reply multicast transmission. Then, when the computer 200*a* is judged not to be authorized to execute a reply multicast transmission, the image processing apparatus 100 may notify the computer 200*a* that the reply multicast transmission is not permitted. Specifically, after step S701 in FIG. 20, the CPU 101 of the image processing apparatus 100 judges, with reference to the data table shown by FIG. 9, whether the e-mail address of the sender of the reply e-mail (the computer 200*a* in this embodiment) is included in the receivers of the multicast transmission identified by the job ID. This prevents execution of a reply multicast transmission from a person other than the receivers of the multicast transmission.

In this embodiment, the job ID is automatically issued by the image processing apparatus 100. However, the job ID may be inputted by the user.

In this embodiment, also, the job ID is entered as the subject of an e-mail. However, the job ID may be entered in the text of the e-mail.

In this embodiment, the image processing apparatus 100 is not necessarily an MFP as long as it has a function of executing a multicast transmission.

In this embodiment, the data sent by a multicast transmission and/or by a reply multicast transmission are not necessarily image data. The data may be, for example, text data, etc. Further, it is not always necessary to attach a data file to an e-mail, and only the text of an e-mail may be sent by a multicast transmission and/or by a reply multicast transmission.

In this embodiment, further, a receiver of SMB (server message block) may be included in the receivers of a multicast transmission and/or a reply multicast transmission.

Although the present invention has been described in connection with the preferred embodiment above, it is to be noted that various changes and modifications are possible to those who are skilled in the art. Such changes and modifications are to be understood as being within the scope of the present invention.

What is claimed is:

1. A data communication system comprising an image processing apparatus and a data communication device,
    wherein said image processing apparatus comprises:
        a multicast transmission section for making an e-mail including identification information for identifying a multicast transmission and for executing a multicast transmission including a transmission of the e-mail and a transmission of information included in the e-mail under a communication protocol; and
        a history information generating section for generating history information showing the identification information and receivers of the multicast transmission identified by the identification information in connection with each other,
    wherein said data communication device is connected to said image processing apparatus via a network so as to be communicable with said image processing apparatus, said data communication device comprising:
        a first receiving section for receiving the e-mail sent by the multicast transmission;
        a first extracting section for extracting the identification information from the e-mail;
        a mail generating section for making a reply e-mail including the identification information; and
        a sending section for sending the reply e-mail to the image processing apparatus,
    wherein said image processing apparatus further comprises:
        a second receiving section for receiving the reply e-mail;
        a second extracting section for extracting the identification information from the reply e-mail; and
        a designating section for designating receivers of a reply multicast transmission based on the identification information and the history information,
    wherein the multicast transmission section executes a reply multicast transmission to the receivers designated by the designating section.

2. A data communication system according to claim 1, wherein said image processing apparatus further comprises an ID issuing section for issuing the identification information.

3. A data communication system according to claim 1, wherein the multicast transmission section of said image processing apparatus enters an e-mail address of said image processing apparatus in the e-mail as an address to which a reply e-mail is to be sent.

4. A data communication system according to claim 1, wherein the multicast transmission section of said image processing apparatus enters the identification information in the e-mail as a subject.

5. A data communication system according to claim 1, wherein the mail generating section of said data communication device enters the identification information in the reply e-mail as a subject.

6. An image processing apparatus which is communicable with a data communication device, comprising:
    a multicast transmission section for making an e-mail including identification information for identifying a multicast transmission and for executing a multicast transmission including a transmission of the e-mail and a transmission of information included in the e-mail under a communication protocol;
    a history information generating section for generating history information showing the identification information and receivers of the multicast transmission identified by the identification information in connection with each other;
    a receiving section for receiving a reply e-mail from said data communication device as a reply to the e-mail sent by the multicast transmission, the reply e-mail including the identification information; the data communication device being connected to said image processing apparatus via a network so as to be communicable with said image processing apparatus;
    an extracting section for extracting the identification information from the reply e-mail; and
    a designating section for designating receivers of a reply multicast transmission based on the identification information and the history information,
    wherein the multicast transmission section executes a reply multicast transmission to the receivers designated by the designating section.

7. An image processing apparatus according to claim 6, further comprising an ID issuing section for issuing the identification information.

8. An image processing apparatus according to claim 6, wherein the multicast transmission section enters an e-mail address of said image processing apparatus in the e-mail as an address to which a reply e-mail is to be sent.

9. An image processing apparatus according to claim 6, wherein the multicast transmission section enters the identification information in the e-mail as a subject.

10. A non-transitory computer readable medium storing a software program for causing a computer provided in an image processing apparatus communicable with a data communication device to execute processing comprising:
    a step of executing a multicast transmission by making an e-mail including identification information for identifying the multicast transmission and by executing a transmission of the e-mail and a transmission of information included in the e-mail under a communication protocol;
    a step of generating history information showing the identification information and receivers of the multicast transmission identified by the identification information in connection with each other;

a step of receiving a reply e-mail from said data communication device as a reply to the e-mail sent by the multicast transmission, the reply e-mail including the identification information; the data communication device being connected to said image processing apparatus via a network so as to be communicable with said image processing apparatus;

a step of extracting the identification information from the reply e-mail; a step of designating receivers of a reply multicast transmission based on the identification information and the history information; and a step of executing a reply multicast transmission to the designated receivers.

11. A non-transitory computer readable medium according to claim 10, wherein the processing further comprises a step of issuing the identification information.

12. A non-transitory computer readable medium according to claim 10, wherein the step of executing a multicast transmission includes entering an e-mail address of the image processing apparatus in the e-mail as an address to which a reply e-mail is to be sent.

13. A non-transitory computer readable medium according to claim 10, wherein the step of executing a multicast transmission includes entering the identification information in the e-mail as a subject.

14. A data communication method carried out by an image processing apparatus communicable with a data communication device, said method comprising:

a step of executing a multicast transmission by making an e-mail including identification information for identifying the multicast transmission and by executing a transmission of the e-mail and a transmission of information included in the e-mail under a communication protocol;

a step of generating history information showing the identification information and receivers of the multicast transmission identified by the identification information in connection with each other;

a step of receiving a reply e-mail from said data communication device as a reply to the e-mail sent by the multicast transmission, the reply e-mail including the identification information; the data communication device being connected to said image processing apparatus via a network so as to be communicable with said image processing apparatus;

a step of extracting the identification information from the reply e-mail; and a step of designating receivers of a reply multicast transmission based on the identification information and the history information; and a step of executing a reply multicast transmission to the designated receivers.

15. A data communication method according to claim 14, further comprising a step of issuing the identification information.

16. A data communication method according to claim 14, wherein the step of executing a multicast transmission includes entering an e-mail address of the image processing apparatus in the e-mail as an address to which a reply e-mail is to be sent.

17. A data communication method according to claim 14, wherein the step of executing a multicast transmission includes entering the identification information in the e-mail as a subject.

* * * * *